(12) United States Patent
Chen et al.

(10) Patent No.: US 11,782,812 B2
(45) Date of Patent: Oct. 10, 2023

(54) CAUSAL ATTENTION-BASED MULTI-STREAM RNN FOR COMPUTER SYSTEM METRIC PREDICTION AND INFLUENTIAL EVENTS IDENTIFICATION BASED ON METRIC AND EVENT LOGS

(71) Applicant: NEC Laboratories America, Inc., Princeton, NJ (US)

(72) Inventors: Yuncong Chen, Plainsboro, NJ (US); Zhengzhang Chen, Princeton Junction, NJ (US); Cristian Lumezanu, Princeton Junction, NJ (US); Masanao Natsumeda, Princeton Junction, NJ (US); Xiao Yu, Princeton, NJ (US); Wei Cheng, Princeton Junction, NJ (US); Takehiko Mizoguchi, West Windsor, NJ (US); Haifeng Chen, West Windsor, NJ (US)

(73) Assignee: NEC Corporation

( * ) Notice: Subject to any disclaimer, the term of this patent is extended or adjusted under 35 U.S.C. 154(b) by 63 days.

(21) Appl. No.: 17/491,632

(22) Filed: Oct. 1, 2021

(65) Prior Publication Data
US 2022/0107878 A1      Apr. 7, 2022

Related U.S. Application Data

(60) Provisional application No. 63/086,634, filed on Oct. 2, 2020.

(51) Int. Cl.
*G06F 11/34* (2006.01)
*G06N 3/08* (2023.01)
*G06N 3/045* (2023.01)

(52) U.S. Cl.
CPC ........ *G06F 11/3476* (2013.01); *G06N 3/045* (2023.01); *G06N 3/08* (2013.01)

(58) Field of Classification Search
CPC ............ G06F 11/3476; G06F 2201/86; G06F 11/3055; G06F 11/3409; G06F 11/3447;
(Continued)

(56) References Cited

U.S. PATENT DOCUMENTS

| | | |
|---|---|---|
| 6,216,119 B1 | 4/2001 | Jannarone |
| 10,339,421 B2 * | 7/2019 | Mei ...................... G06V 10/764 |

(Continued)

OTHER PUBLICATIONS

Zhuang et al. (Multi-stream RNN for Merchant Transaction Prediction, 2020) (Year: 2020).*

(Continued)

*Primary Examiner* — Mohammad K Islam
(74) *Attorney, Agent, or Firm* — Joseph Kolodka

(57) ABSTRACT

A method for system metric prediction and influential events identification by concurrently employing metric logs and event logs is presented. The method includes concurrently modeling multivariate metric series and individual events in event series by a multi-stream recurrent neural network (RNN) to improve prediction of future metrics, where the multi-stream RNN includes a series of RNNs, one RNN for each metric and one RNN for each event sequence and modeling causality relations between the multivariate metric series and the individual events in the event series by employing an attention mechanism to identify target events most responsible for fluctuations of one or more target metrics.

20 Claims, 13 Drawing Sheets

(58) Field of Classification Search
CPC ...... G06F 11/3003; G06N 3/045; G06N 3/08; G06N 7/01; G06N 3/044
See application file for complete search history.

(56) References Cited

U.S. PATENT DOCUMENTS

| | | |
|---|---|---|
| 2009/0112809 A1 | 4/2009 | Wolff et al. |
| 2010/0238814 A1 | 9/2010 | Chen et al. |
| 2011/0047496 A1 | 2/2011 | Harrison |
| 2012/0072780 A1 | 3/2012 | Kini et al. |
| 2018/0211156 A1* | 7/2018 | Guan ............... G06N 3/044 |
| 2018/0308001 A1* | 10/2018 | Doddala ............ H04L 41/16 |
| 2019/0213476 A1* | 7/2019 | Singh ............... G06N 3/044 |
| 2019/0354836 A1* | 11/2019 | Shah ................ G06N 3/045 |
| 2020/0120110 A1* | 4/2020 | Stokes, III ........ H04L 63/1416 |
| 2021/0049460 A1* | 2/2021 | Ahn ................. G06N 3/045 |
| 2021/0224648 A1* | 7/2021 | Zhuang ............. G06N 3/045 |
| 2021/0375459 A1* | 12/2021 | Longmire .......... G16H 20/00 |
| 2022/0084677 A1* | 3/2022 | Gupta .............. G06V 10/82 |
| 2022/0114494 A1* | 4/2022 | Sousa .............. G06N 20/00 |
| 2022/0245426 A1* | 8/2022 | Branco ............. G06N 3/084 |
| 2023/0027828 A1* | 1/2023 | Aguilar Alas ...... G10L 15/22 |

OTHER PUBLICATIONS

Tryambak Gangopadhyay et al., 'Spatiotemporal Attention for Multivariate Time Series Prediction and Interpretation', arXiv:2008.04882v1, Aug. 2020 [retrieved on Jan. 5, 2022]. Retrieved from (https://arxiv.org/abs/2008.04882v1 > p. 1.

* cited by examiner

US 11,782,812 B2

CAUSAL ATTENTION-BASED MULTI-STREAM RNN FOR COMPUTER SYSTEM METRIC PREDICTION AND INFLUENTIAL EVENTS IDENTIFICATION BASED ON METRIC AND EVENT LOGS

RELATED APPLICATION INFORMATION

This application claims priority to Provisional Application No. 63/086,634, filed on Oct. 2, 2020, the contents of which are incorporated herein by reference in their entirety.

BACKGROUND

Technical Field

The present invention relates to system metrics prediction and, more particularly, to a causal attention-based multi-stream recurrent neural network (RNN) for computer system metric prediction and influential events identification based on metric and events logs.

Description of the Related Art

In order to monitor the health status and performance of computing systems, metrics and event messages from different system components are constantly recorded. The metrics commonly include performance and resource counters (e.g., CPU usage, memory usage, free disk space) and hardware condition (e.g., CPU temperature, power consumption). The event messages commonly include system event logs and hardware event logs (e.g., IPMI logs, iLO logs). The metrics constitute multivariate time series, potentially with different temporal intervals. The event messages constitute timestamped sequence of texts. The metric series and event message sequences are complementary, jointly characterizing the behavior of a system. They also show complicated correlation, because many actions that cause changes of metrics are recorded in event logs. For example, starting a service increases the CPU and memory utilization, and installing system updates decreases disk space. Different metrics may be correlated with each other as they measure the same underlying performance factor. For example, both CPU and memory usage reflects the level of system activity.

Predicting performance and resource metrics of computing systems is beneficial for predictive maintenance and in-advance resource planning (e.g., provision more virtual machines, increase disk spaces). Accurate prediction of a metric requires considering the dynamics of other metrics and event logs. Furthermore, it is often desired that the system events causing particular predicted metric changes can be identified in order to make the predictions reliable and explainable.

SUMMARY

A method for system metric prediction and influential events identification by concurrently employing metric logs and event logs is presented. The method includes concurrently modeling multivariate metric series and individual events in event series by a multi-stream recurrent neural network (RNN) to improve prediction of future metrics, where the multi-stream RNN includes a series of RNNs, one RNN for each metric and one RNN for each event sequence and modeling causality relations between the multivariate metric series and the individual events in the event series by employing an attention mechanism to identify target events most responsible for fluctuations of one or more target metrics.

A non-transitory computer-readable storage medium comprising a computer-readable program for system metric prediction and influential events identification by concurrently employing metric logs and event logs is presented. The computer-readable program when executed on a computer causes the computer to perform the steps of concurrently modeling multivariate metric series and individual events in event series by a multi-stream recurrent neural network (RNN) to improve prediction of future metrics, where the multi-stream RNN includes a series of RNNs, one RNN for each metric and one RNN for each event sequence and modeling causality relations between the multivariate metric series and the individual events in the event series by employing an attention mechanism to identify target events most responsible for fluctuations of one or more target metrics.

A system for system metric prediction and influential events identification by concurrently employing metric logs and event logs is presented. The system includes a memory and one or more processors in communication with the memory configured to concurrently model multivariate metric series and individual events in event series by a multi-stream recurrent neural network (RNN) to improve prediction of future metrics, where the multi-stream RNN includes a series of RNNs, one RNN for each metric and one RNN for each event sequence and model causality relations between the multivariate metric series and the individual events in the event series by employing an attention mechanism to identify target events most responsible for fluctuations of one or more target metrics.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention offers a data-driven approach to solve metric prediction and causal event identification issues. Traditional approaches for system metrics prediction only used historical metrics data, based on the assumption that the metrics are endogenous. Traditional approaches, however, neglect the fact that most metric changes are driven by system events. The exemplary invention describes a multi-stream recurrent neural network (RNN) to model the multivariate metric series and event series jointly to improve the prediction of future metrics. Furthermore, an attention mechanism is employed to explicitly model causality relations between system events and metrics, as well as relations between different metrics.

The exemplary invention employs the use of event logs to improve metrics prediction and furthermore, to provide explanations. In particular, a multi-stream recurrent network is developed to seamlessly combine event logs with multi-variate system metrics. An attention mechanism is used in the network to identify which events are most responsible for fluctuations or sudden changes of certain target metrics.

Figure 1:
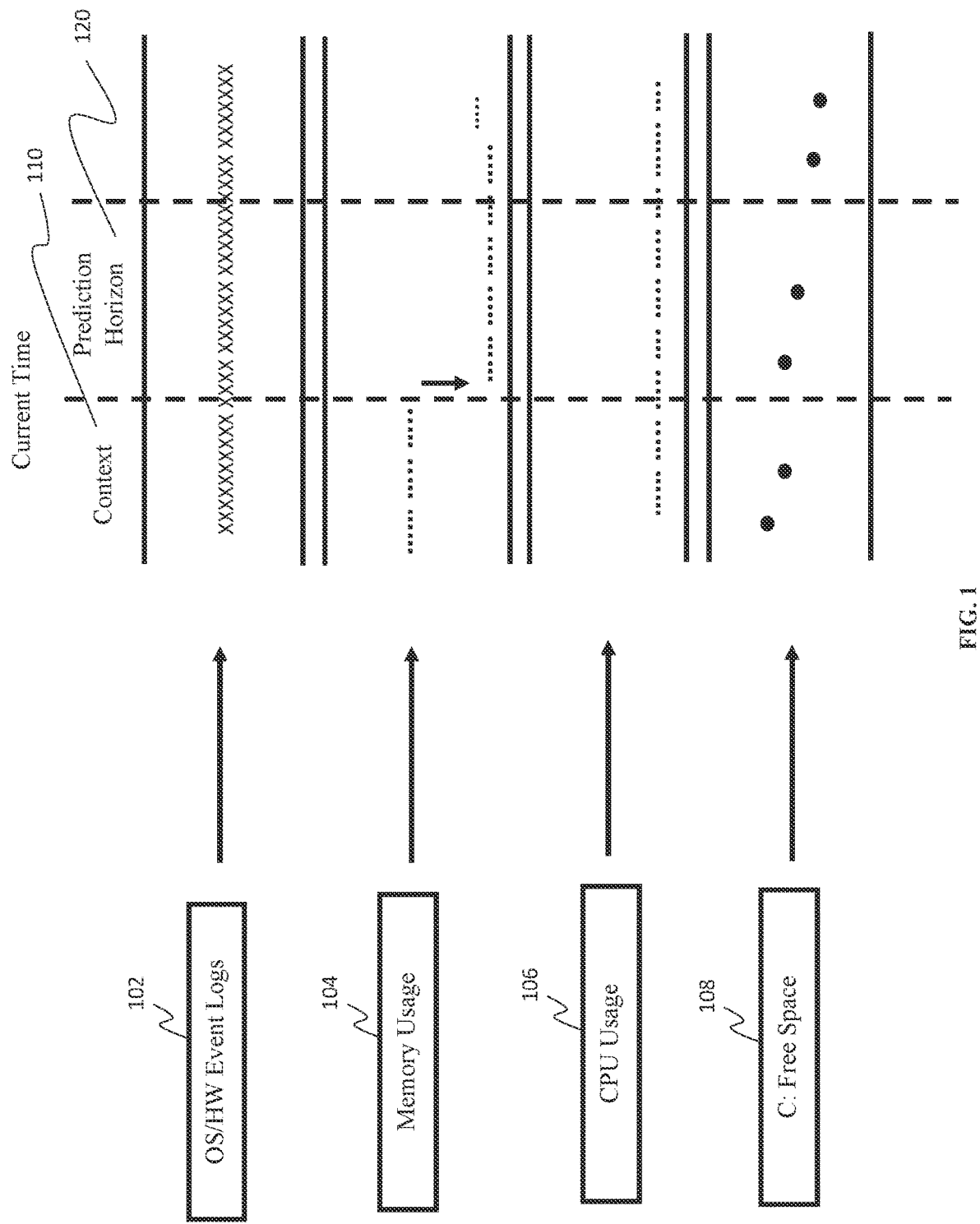
FIG. 1 is a block/flow diagram of exemplary log data of three metric series and one event sequence, in accordance with embodiments of the present invention.

FIG. 1 illustrates example log data of three metric series and one event sequence.

In particular, a first metric series 104 relates to memory usage, a second metric series 106 relates to CPU usage, and a third metric series 108 relates to free space. The event sequence 102 relates to event logs. A context window 110 and a horizon window 120 are further illustrated.

The training network uses historical log data. The plots represent random samples of training segments. At test time, the user specifies a start time and the horizon of prediction 120. Context log data 110 preceding the current time are input to the network, which generates predictions and a ranked list of events most responsible for the metric changes.

Figure 2:
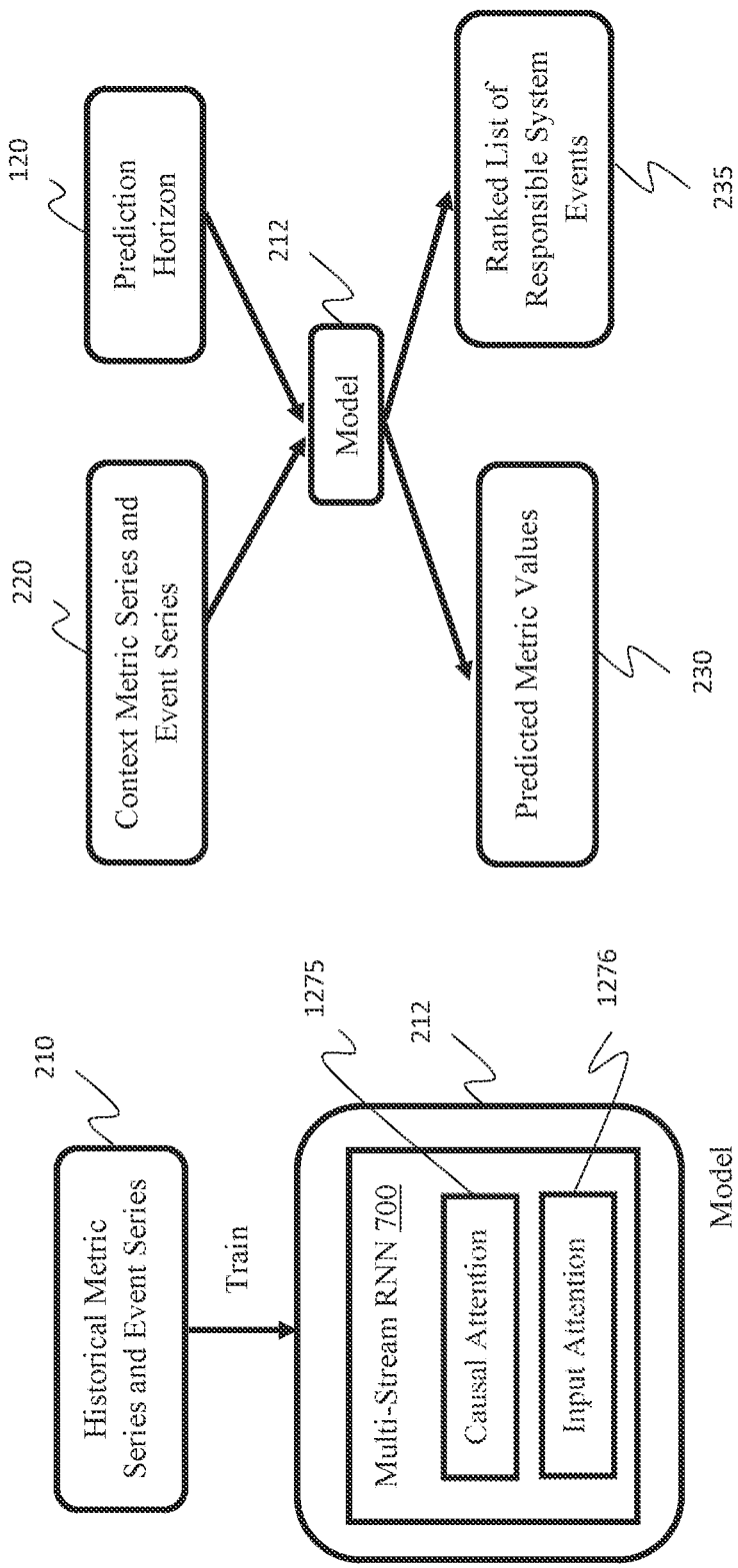
FIG. 2 is a block/flow diagram of an exemplary training network using historical log data, in accordance with embodiments of the present invention.

In FIG. 2, historical metric series and event series data 210 are used to train the model 212. The model 212 can include a multi-stream RNN 700 implementing a causal attention mechanism 1275 and an input attention mechanism 1276.

Additionally, the model 212 can employ context metric series and event series data 220, as well as a prediction horizon 120 to determine predicted metric values 230 and create a ranked list 235 of responsible or target system events.

The system uses a multi-stream recurrent neural network 700 that models the temporal dynamics and the mutual relationships of the multivariate metric series and of individual events 220 in the event series. Two attention mechanisms 1275, 1276 are used to improve prediction performance and provide interpretability. Causal attention 1275 assigns weights to different events in the context to model their different influence on the prediction of particular metrics. Input attention 1276 assigns weights to different metrics to model the influence of every metric on a particular metric's prediction. The neural network 700 is first trained using historical metrics and historical event logs. After training, at any time during system operation, the user (e.g., IT administrator) specifies a prediction horizon 120 during which the values of certain metrics are to be predicted 230. The system then retrieves log data in a "context" time window of certain length immediately before the current time, which includes both metric series and events that occurred during that time window. Finally, the model 212 makes predictions based on the context and also identifies a ranked list 235 of events that are most likely to cause the metric changes between the start and the end of the prediction horizon 120.

Figure 3:
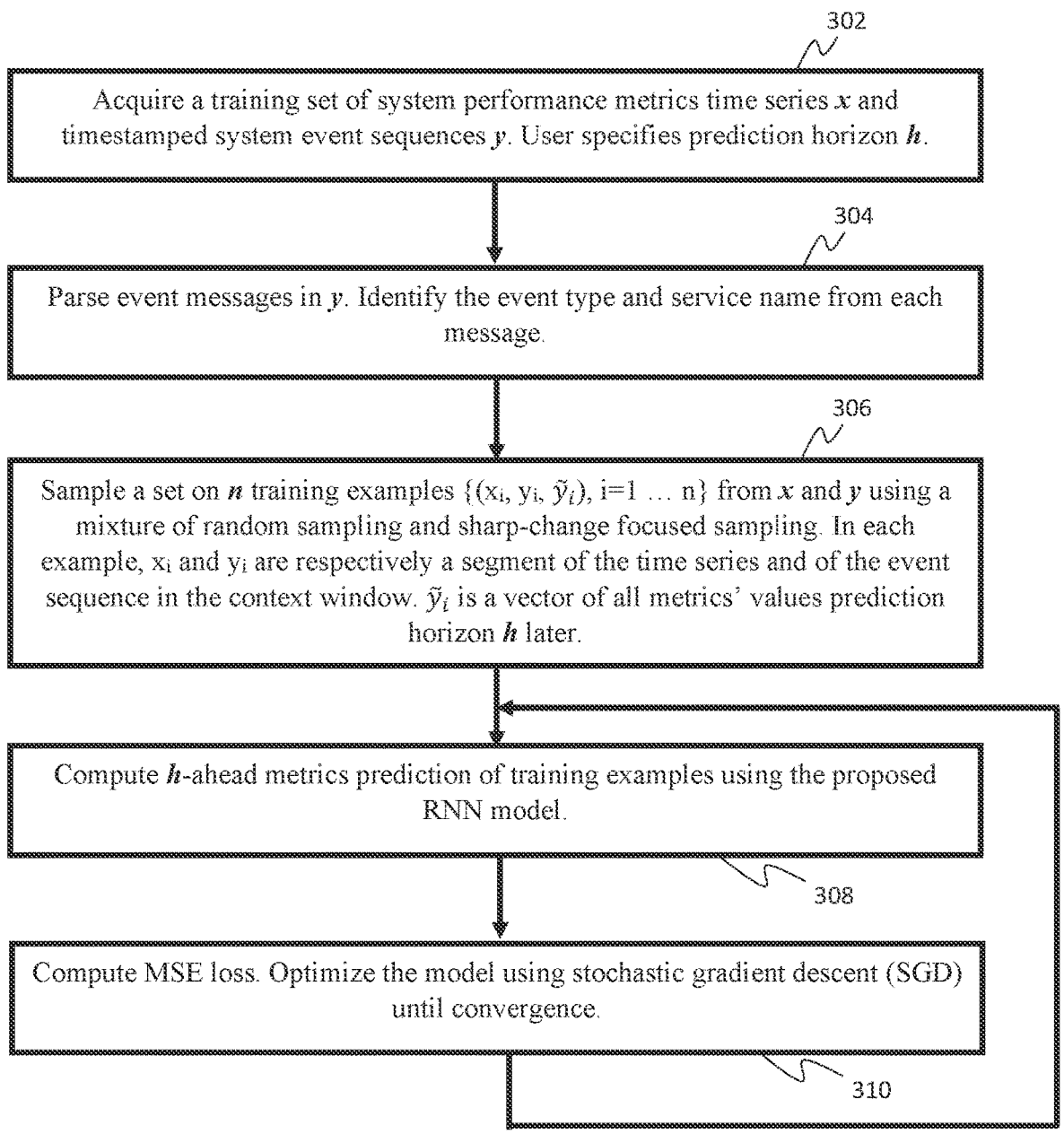
FIG. 3 is a block/flow diagram of an exemplary training procedure, in accordance with embodiments of the present invention.

FIG. 3 is a block/flow diagram of an exemplary training procedure, in accordance with embodiments of the present invention.

At block 302, acquire a training set of system performance metrics time series x and timestamped system event sequences y. The user specifies the prediction horizon h.

At block 304, parse event messages in y and identify the event type and service name from each message.

At block 306, sample a set on n training examples $\{(x_i, y_i, \tilde{y}_i), i=1 \ldots n\}$ from x and y using a mixture of random sampling and sharp-change focused sampling. In each example, $x_i$ and $y_i$ are respectively a segment of the time series and of the event sequence in the context window. $\tilde{y}_i$ is a vector of all metrics' values prediction horizon h later.

At block 308, compute h-ahead metrics prediction of training examples using the proposed model 212.

At block 310, compute the mean squared error (MSE) loss and optimize the model using stochastic gradient descent (SGD) until convergence.

Figure 4:
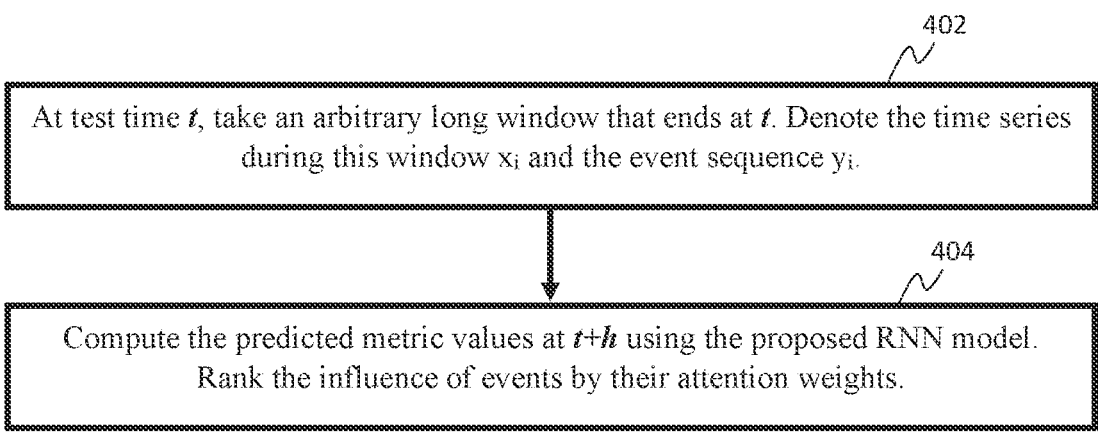
FIG. 4 is a block/flow diagram of an exemplary testing procedure, in accordance with embodiments of the present invention.

FIG. 4 is a block/flow diagram of an exemplary testing procedure, in accordance with embodiments of the present invention.

At block 402, at test time t, take an arbitrary long window that ends at t. Denote the time series during this window $x_i$ and the event sequence $y_i$.

At block 404, compute the predicted metric values at t+h using the proposed model 212. Rank the influence of events by their attention weights.

Figure 5:
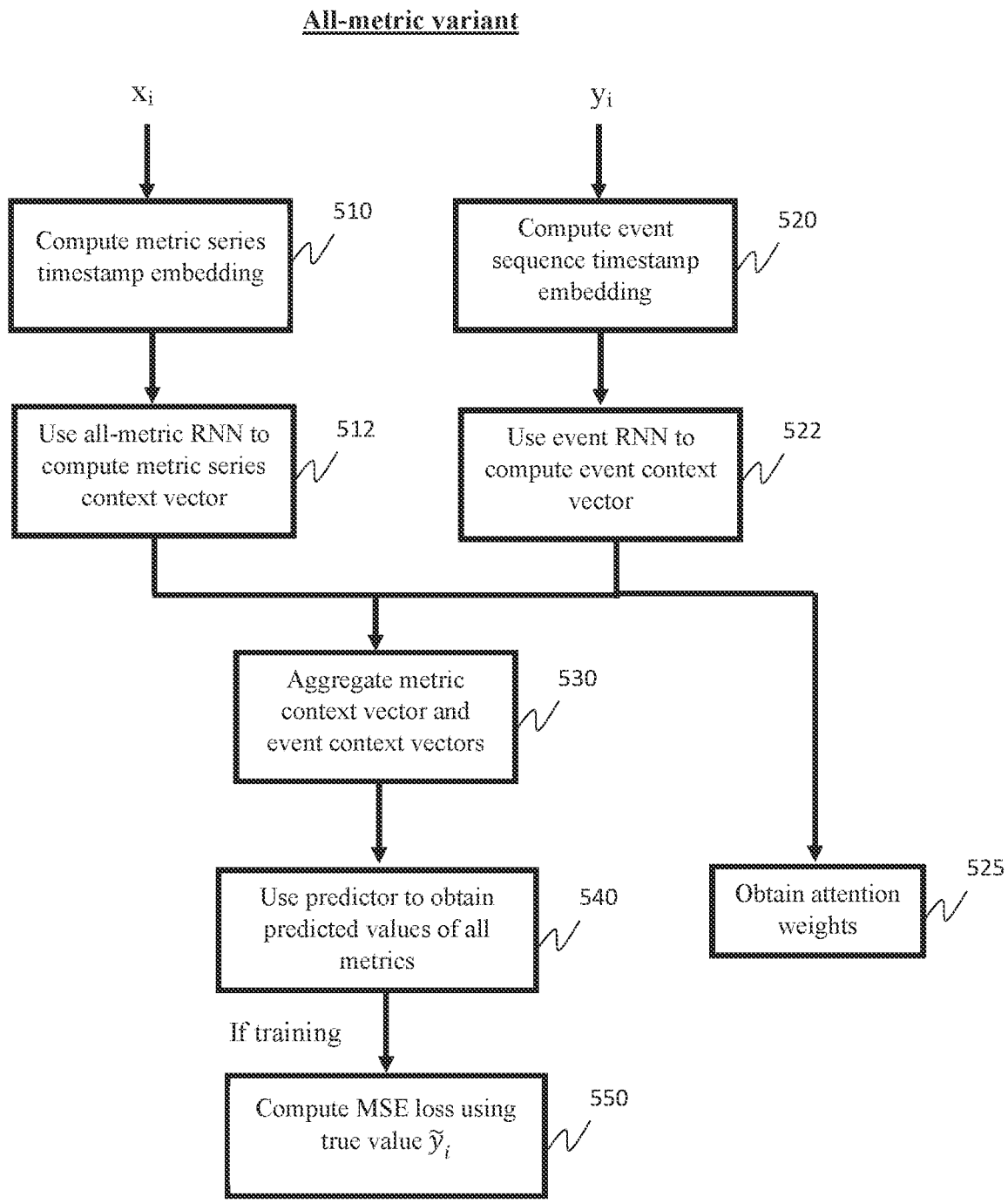
FIG. 5 is a block/flow diagram of an exemplary compute prediction for an all-metric variant, in accordance with embodiments of the present invention.

FIG. 5 is a block/flow diagram of an exemplary compute prediction for an all-metric variant, in accordance with embodiments of the present invention.

At block 510, receive a segment of the time series $x_i$, and compute metric series timestamp embedding.

At block 512, use all-metric RNN to compute the metric series context vector.

At block 520, receive an event sequence $y_i$, and compute the event sequence timestamp embedding.

At block 522, use the event RNN to compute the event context vector.

At block 530, aggregate metric context vector and event context vectors from block 512, 522.

At block 525, obtain the attention weights.

At block 540, use the predictor to obtain predicted values of all metrics.

At block 550, if in training mode, compute the MSE loss by using true value $\tilde{y}_i$.

Figure 6:
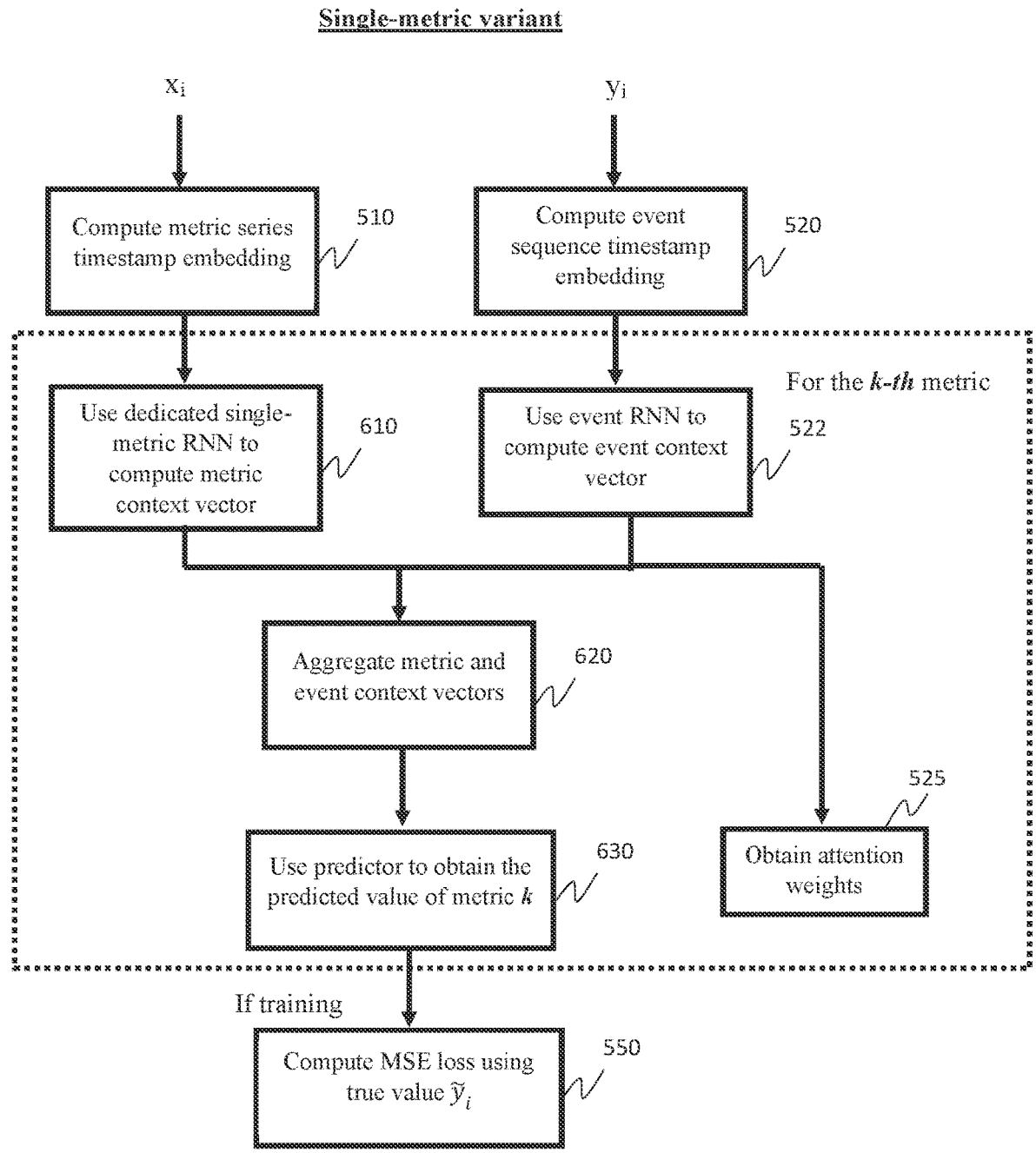
FIG. 6 is a block/flow diagram of an exemplary compute prediction for a single-metric variant, in accordance with embodiments of the present invention.

FIG. 6 is a block/flow diagram of an exemplary compute prediction for a single-metric variant, in accordance with embodiments of the present invention.

At block 510, receive a segment of the time series $x_i$, and compute metric series timestamp embedding.

At block 610, use dedicated single-metric RNN to compute the metric context vector.

At block 520, receive an event sequence $y_i$, and compute the event sequence timestamp embedding.

At block 522, use the event RNN to compute the event context vector.

At block 620, aggregate metric and event context vectors from block 610, 522.

At block 525, obtain the attention weights.

At block 630, use the predictor to obtain the predicted value of metric k.

At block 550, if in training mode, compute the MSE loss by using true value $\tilde{y}_i$.

Thus, with regard to FIGS. 5 and 6, given a training dataset of historical computer system logs that include multiple time series of more than one system metric and one series of event message, the model 700 is first trained using sampled segments from this dataset. The start time of the segments are uniformly sampled across the training data's time range and the lengths of the segments are randomly sampled within a given range. Since uniform sampling mostly obtains intervals where metrics do not show many variations, a second biased sampling strategy that focuses on collecting intervals with fluctuating or sharp changing metrics is also performed. In this strategy, a change point detection method is first employed to find timepoints for each metric where that metric shows significant change. One possible choice is the Bayesian change-point detection method. Once a given number of change-points are detected for each metric, an interval is sampled around each change-point. The set of uniformly sampled segments and the set of fluctuation-focused segments are combined to form the overall set of training segments, in which each segment includes multivariate metric series and an event sequence.

Figure 7:
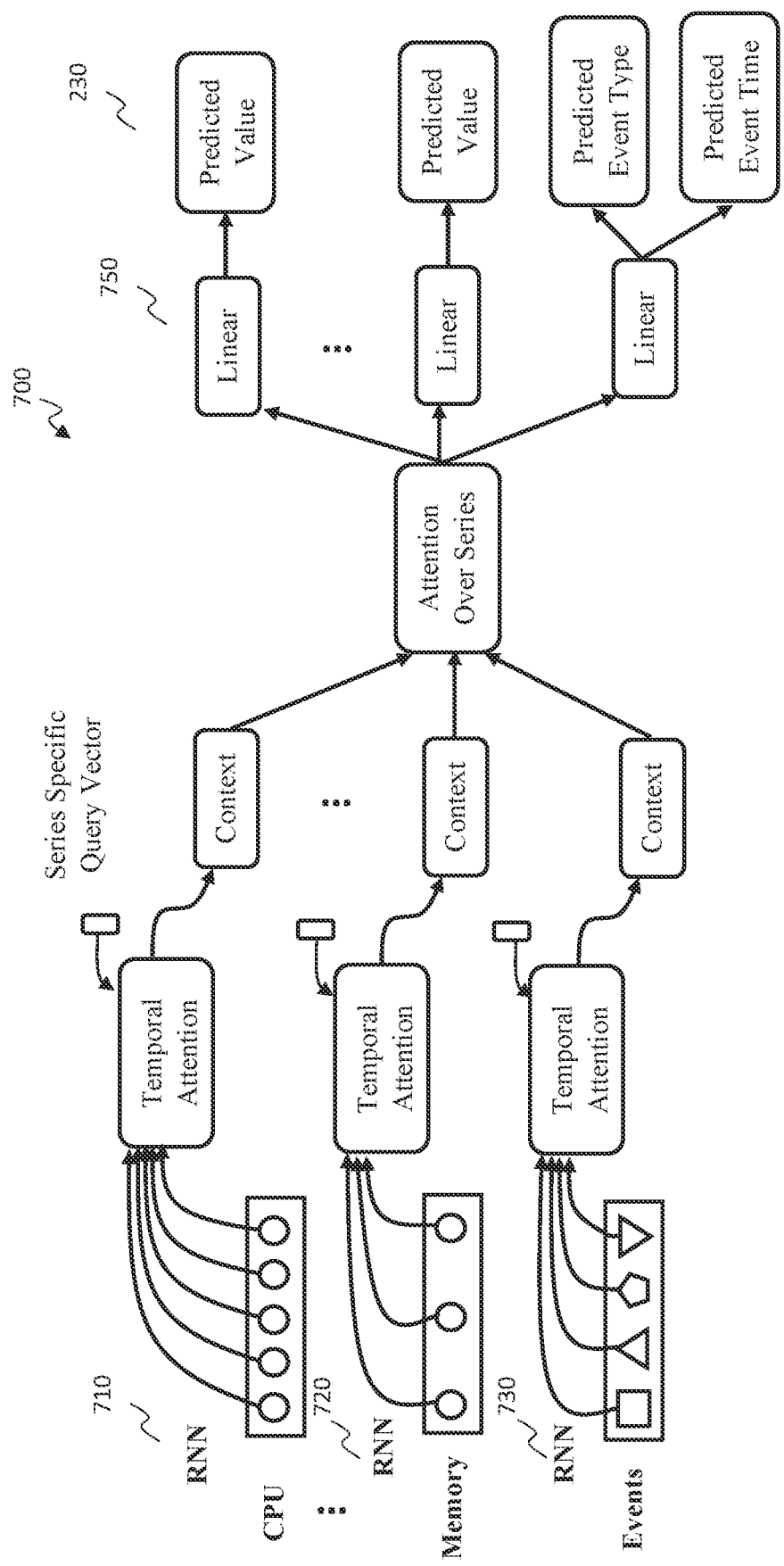
FIG. 7 is a block/flow diagram of an exemplary multi-stream recurrent neural network (RNN) architecture for an all-metric variant, in accordance with embodiments of the present invention.

FIG. 7 is a block/flow diagram of an exemplary multi-stream RNN architecture 700 for an all-metric variant, in accordance with embodiments of the present invention.

The multi-stream RNN network 700 includes of a series of RNNs 710, 720, 730, one for each metric and an additional one for the event sequence. A time embedding layer is learned using Time2Vec 810 and converts the timestamp to a vector.

Figure 8:
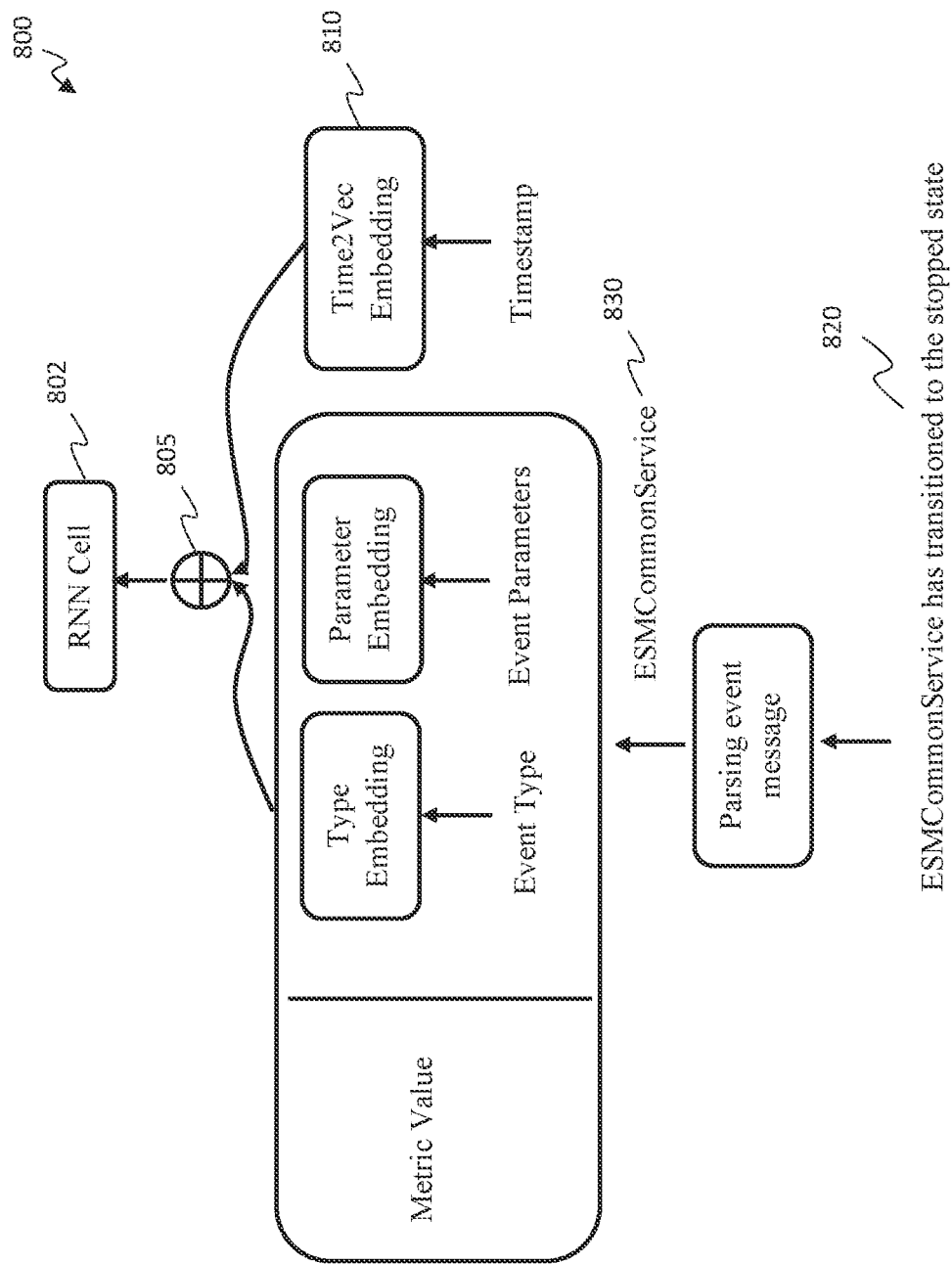
FIG. 8 is a block/flow diagram of exemplary input to the RNN, in accordance with embodiments of the present invention.

FIG. 8 is a block/flow diagram of exemplary input 800 to the RNN, in accordance with embodiments of the present invention.

For metric series, the input to each metric RNN at each timestep is the concatenation 805 of the metric value at that timestep and a time embedding vector 810.

Regarding FIGS. 7 and 8, for the event sequence, a log parser (e.g., Drain[?] or Spell[?]) is first used to decompose every event message into two parts, that is, the template and the parameters. For example, the message "ESMCommon-Service has transitioned to the stopped state" 820 is converted to a template "[*] has transitioned to the stopped state" and the parameter "ESMCommonService" 830. A template type embedding layer and a parameter embedding layer are learned to convert the template type and parameters to vectors, respectively. For each event in the sequence, the template type embedding vector, the parameter embedding vector and the time embedding vector are concatenated 805 and used as input to the event RNN 802.

For each of the metrics RNNs and the event RNN, causal temporal attention is used over the hidden states to compute a context vector. A distinct attention layer is used on each RNN to reflect the fact that different metrics tend to draw on different information from the past input window. Compared to the traditional dot-product attention in which the attention weights of all items sum to 1, in causal attention the weights are independent of each other.

The weight of the i-th item $v_i$ is $\alpha_i = |\tanh(q^T v_i)|$ where q is the query vector that is specific to each metric.

A second attention module is applied over the context vectors of every RNN. This selectively aggregates the information from different metrics. Dot-product attention is used. The resulting aggregated vector is forwarded to metric-specific linear layers 750 (FIG. 7) to generate the respective predicted future values 230 for each metric. The network loss is computed as the total mean squared error (MSE) of the predicted values compared to true future values. The loss is minimized using stochastic gradient descent (SGD).

Figure 9:
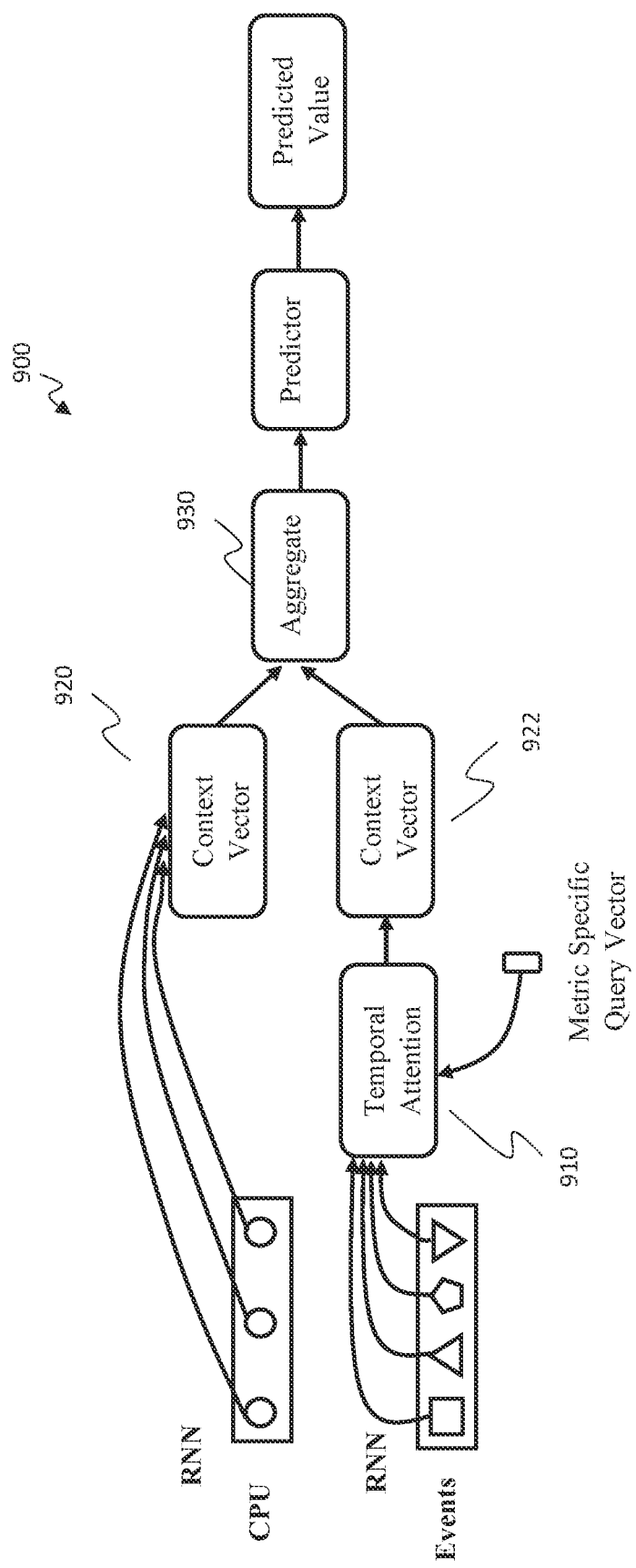
FIG. 9 is a block/flow diagram of an exemplary multi-stream RNN architecture for a single-metric variant, in accordance with embodiments of the present invention.

FIG. 9 is a block/flow diagram of an exemplary multi-stream RNN architecture 900 for a single-metric variant, in accordance with embodiments of the present invention.

To improve metric-specific interpretability, a second "single-metric" variant of the above multi-stream model is also introduced. In this variant, the prediction of each metric is only based on the history of this specific metric and the events, not on data of the other metrics. While the "all-metric" variant models the influence of events on the changes of all metrics, the "single-metric" variant models the influence of events on each individual metric separately, which is easier for users to understand and validate. The event RNN can either be distinct for different metrics or be shared between all metrics. The temporal attention module 910 over events, however, is distinct for each metric. This reflects the consideration that different metrics are usually affected by different types of events.

For each metric, the metric context vector 920 from the metric RNN and the event context vector 922 from the event RNN are concatenated 930 and forwarded through a linear layer to get the prediction for the metric.

After the network is trained, the system can be deployed to monitor a computer system's operation.

At any time during the operation, a user (e.g., IT administrator) can use the trained network to get metric predictions based on the logs in a window preceding the current time. The user specifies a prediction horizon. The logs in the history window (the test segment) are inputted into the trained multi-stream RNN 700, which outputs the predicted metric values 230. These predicted metric values 230 can be used by the user to perform predictive maintenance and resource planning. For each test segment, the temporal attention weights computed over the events in the event sequence input are used to rank the events in term of their importance in predicting target metric values. These provide rationale of the predictions.

Figure 10:
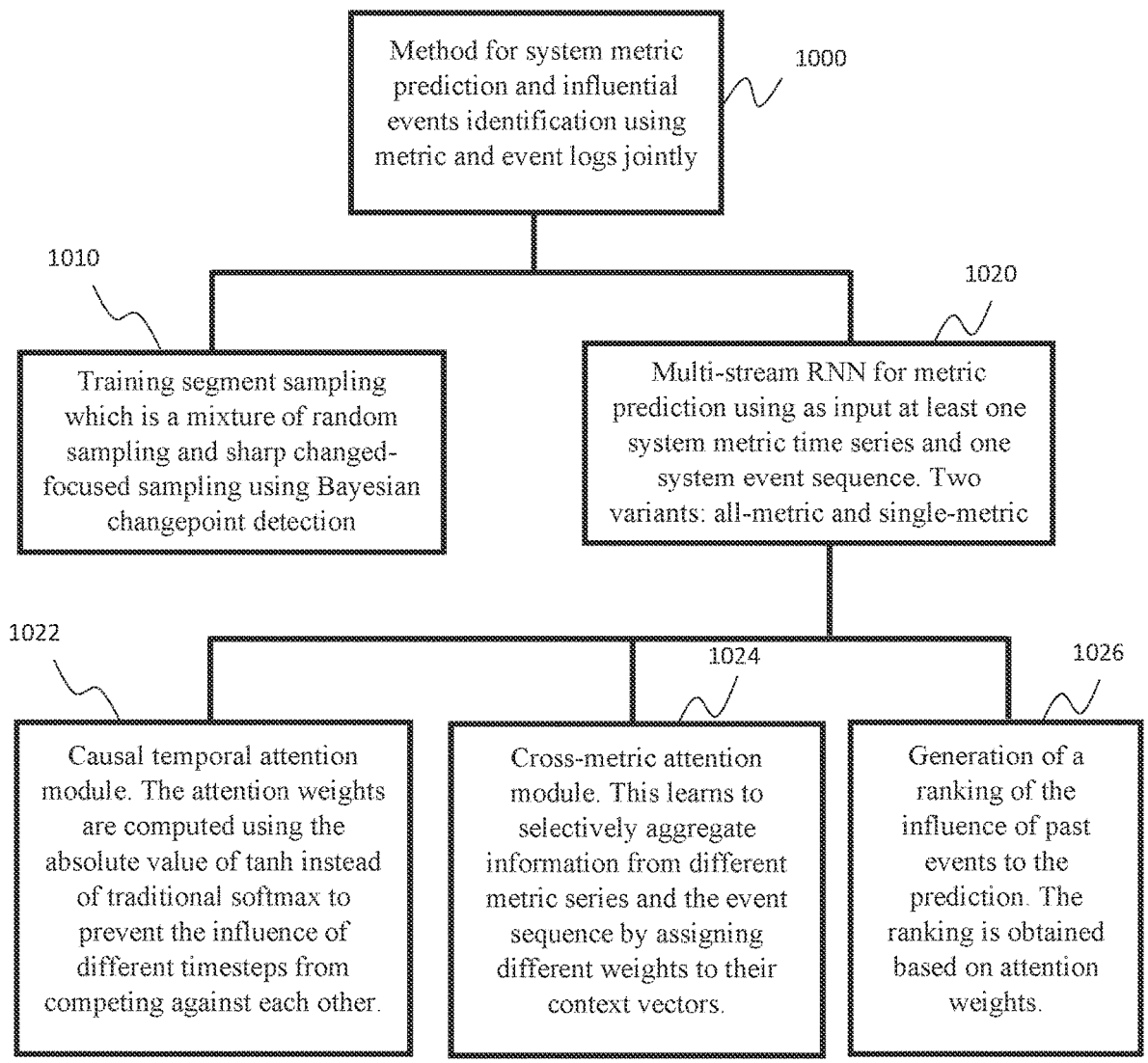
FIG. 10 is a block/flow diagram of an exemplary method for system metric prediction and influential events identification using metric and event logs jointly, in accordance with embodiments of the present invention.

FIG. 10 is a block/flow diagram of an exemplary method for system metric prediction and influential events identification using metric and event logs jointly, in accordance with embodiments of the present invention.

At block 1000, a method for system metric prediction and influential events identification using metric and event logs jointly is presented.

At block 1010, training segment sampling, which is a mixture of random sampling and sharp changed-focused sampling using Bayesian changepoint detection is employed.

At block 1020, multi-stream RNN for metric prediction is employed for using as input at least one system metric time series and one system event sequence. Two variants are presented, that is, an all-metric variant and a single-metric variant.

At block 1022, a causal temporal attention module is implemented. The attention weights are computed using the absolute value of tanh instead of traditional softmax to prevent the influence of different timesteps from competing against each other.

At block 1024, a cross-metric (or input) attention module is implemented. Such module learns to selectively aggregate information from different metric series and the event sequence by assigning different weights to their context vectors.

At block 1026, generation of a ranking of the influence of past events to the prediction is performed. The ranking is obtained based on attention weights.

Figure 11:
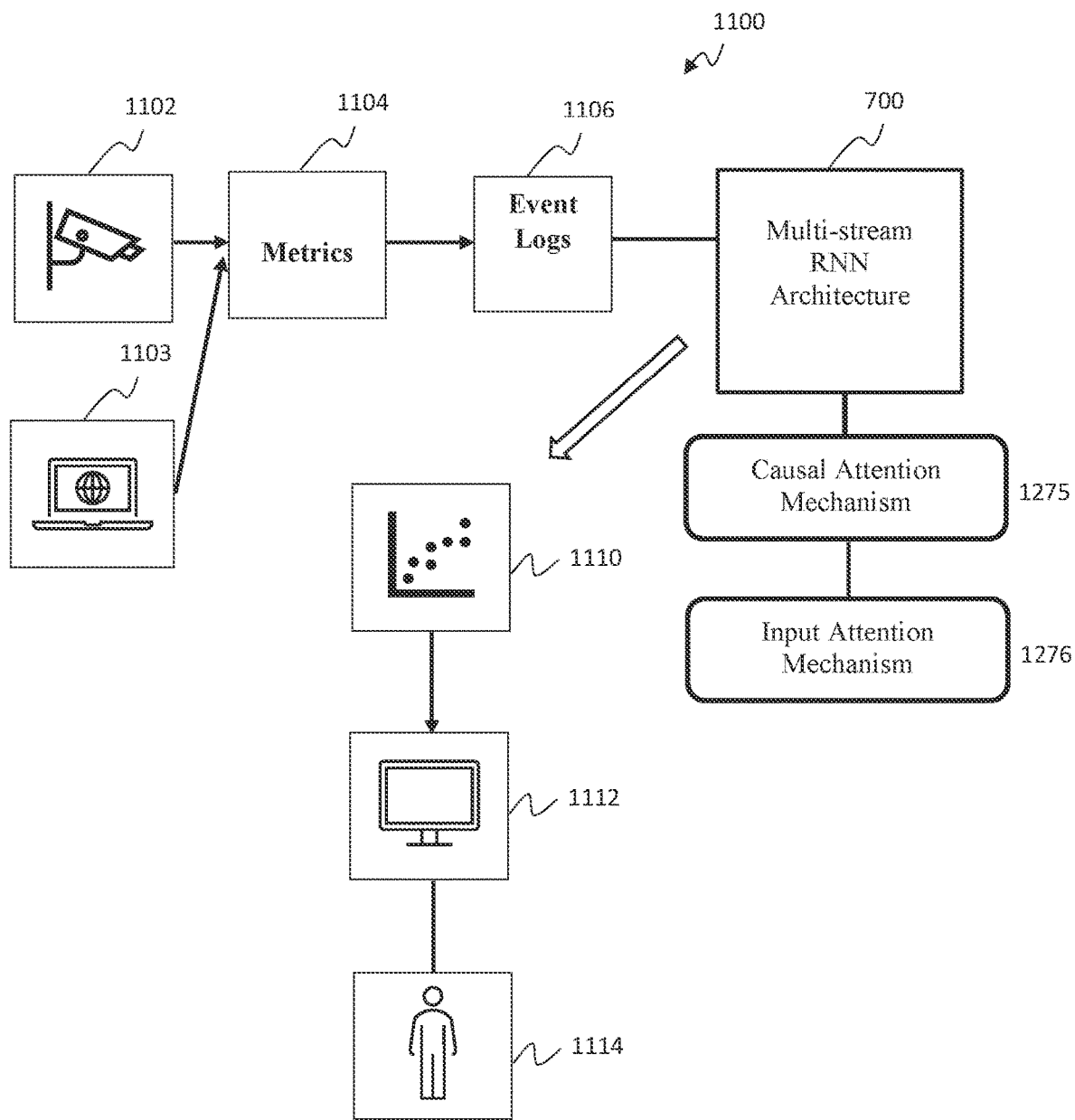
FIG. 11 is an exemplary practical application for system metric prediction and influential events identification by concurrently employing metric logs and event logs, in accordance with embodiments of the present invention.

FIG. 11 is a block/flow diagram 1100 of a practical application for system metric prediction and influential events identification by concurrently employing metric logs and event logs, in accordance with embodiments of the present invention.

In one practical example, a camera 1102 (or computing device 1103) can detect metrics 1104 and event logs 1106. The exemplary methods employ the multi-stream RNN architecture 700 via causal attention mechanism 1275 and input attention mechanism 1276. In one instance, RNN architecture 700 can select one or more metrics and event logs to identify target events most responsible for fluctuations of one or more target metrics. The results 1110 (e.g., target metrics) can be provided or displayed on a user interface 1112 handled by a user 1114.

Figure 12:
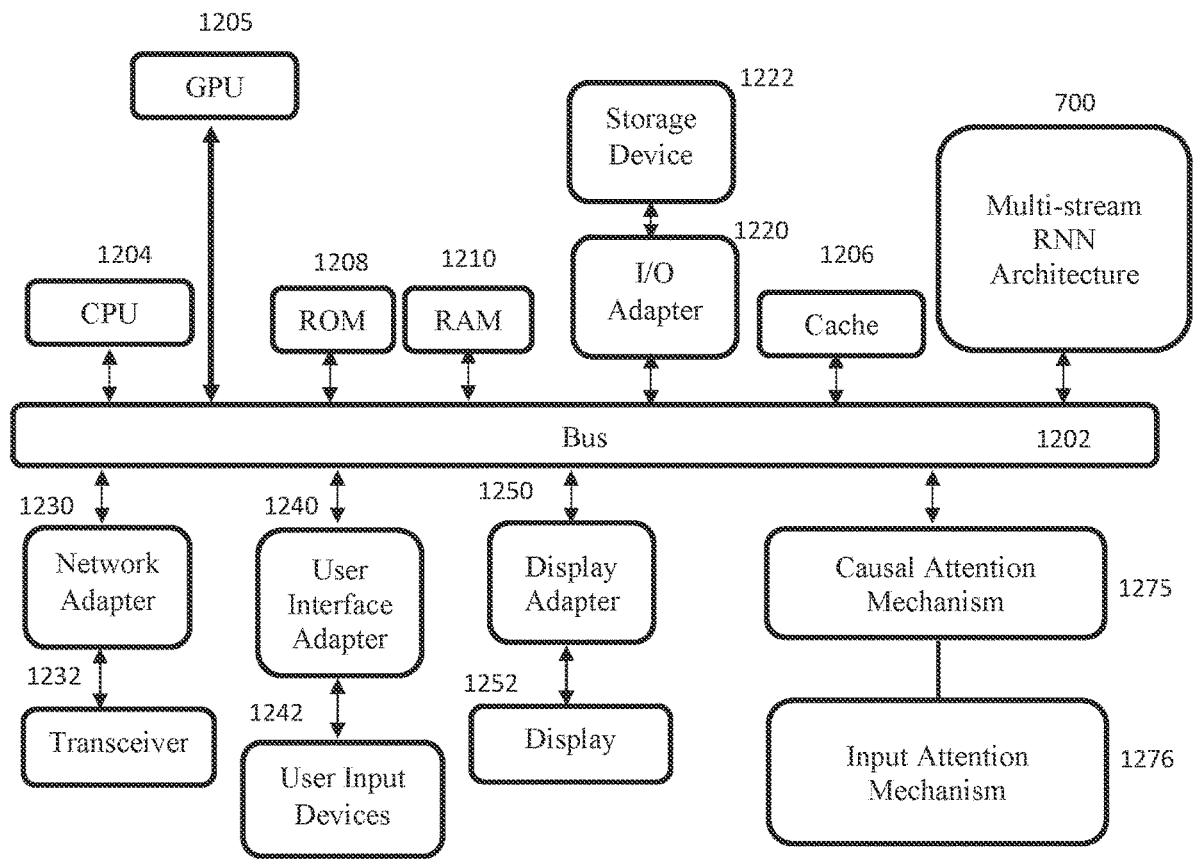
FIG. 12 is an exemplary processing system for system metric prediction and influential events identification by concurrently employing metric logs and event logs, in accordance with embodiments of the present invention.

FIG. 12 is an exemplary processing system for system metric prediction and influential events identification by concurrently employing metric logs and event logs, in accordance with embodiments of the present invention.

The processing system includes at least one processor (CPU) 1204 operatively coupled to other components via a system bus 1202. A GPU 1205, a cache 1206, a Read Only Memory (ROM) 1208, a Random Access Memory (RAM) 1210, an input/output (I/O) adapter 1220, a network adapter 1230, a user interface adapter 1240, and a display adapter 1250, are operatively coupled to the system bus 1202. Additionally, the multi-stream RNN architecture 700 can be employed by using a causal attention mechanism 1275 and an input attention mechanism 1276. Thus, concurrently modeling multivariate metric series and individual events in event series by a multi-stream recurrent neural network (RNN) 700 can improve prediction of future metrics, where the multi-stream RNN includes a series of RNNs, one RNN for each metric and one RNN for each event sequence. Moreover, modeling causality relations between the multivariate metric series and the individual events in the event series can be accomplished by employing an attention mechanism (1275, 1276) to identify target events most responsible for fluctuations of one or more target metrics.

A storage device 1222 is operatively coupled to system bus 1202 by the I/O adapter 1220. The storage device 1222 can be any of a disk storage device (e.g., a magnetic or optical disk storage device), a solid-state magnetic device, and so forth.

A transceiver 1232 is operatively coupled to system bus 1202 by network adapter 1230.

User input devices 1242 are operatively coupled to system bus 1202 by user interface adapter 1240. The user input devices 1242 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 1242 can be the same type of user input device or different types of user input devices. The user input devices 1242 are used to input and output information to and from the processing system.

A display device 1252 is operatively coupled to system bus 1202 by display adapter 1250.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 13:
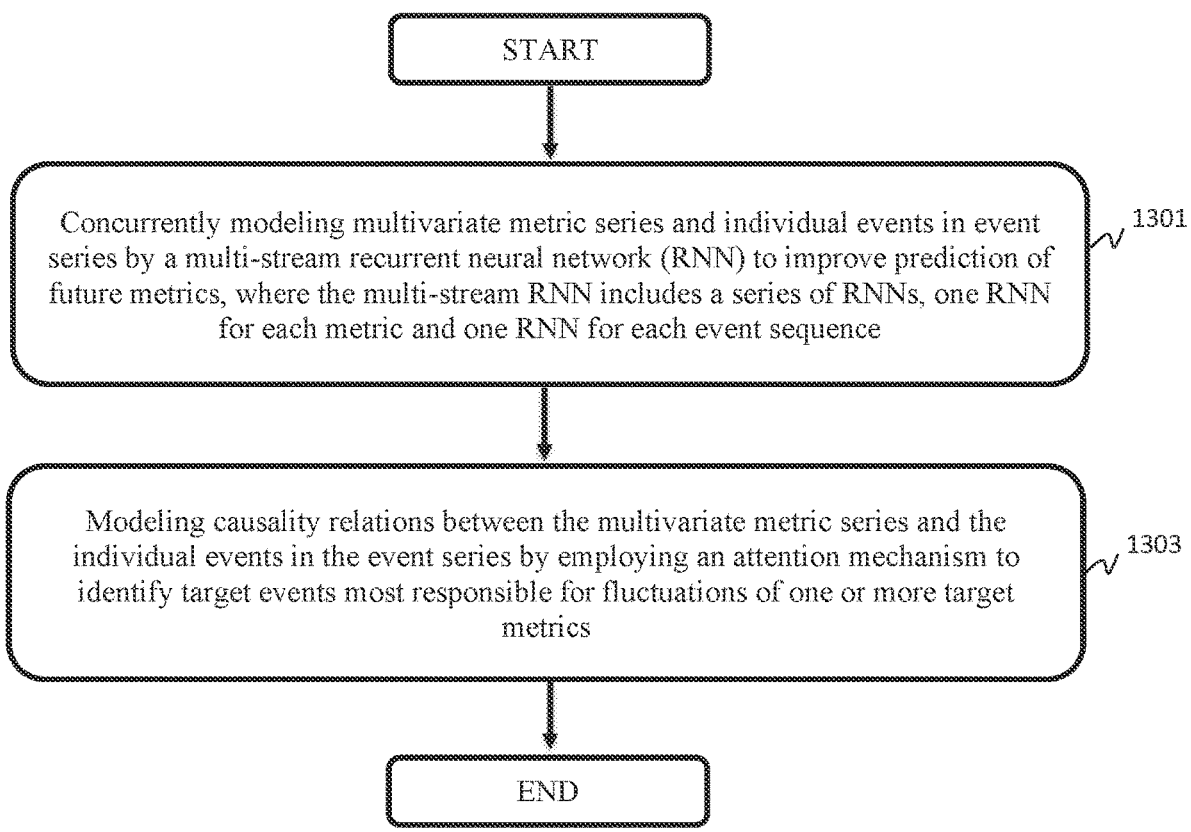
FIG. 13 is a block/flow diagram of an exemplary method for system metric prediction and influential events identification by concurrently employing metric logs and event logs, in accordance with embodiments of the present invention.

FIG. 13 is a block/flow diagram of an exemplary method for system metric prediction and influential events identification by concurrently employing metric logs and event logs, in accordance with embodiments of the present invention.

At block 1301, concurrently modeling multivariate metric series and individual events in event series by a multi-stream recurrent neural network (RNN) to improve prediction of future metrics, where the multi-stream RNN includes a series of RNNs, one RNN for each metric and one RNN for each event sequence.

At block 1303, modeling causality relations between the multivariate metric series and the individual events in the event series by employing an attention mechanism to identify target events most responsible for fluctuations of one or more target metrics.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for system metric prediction and influential events identification by concurrently employing metric logs and event logs, the method comprising:

concurrently modeling multivariate metric series and individual events in event series by a multi-stream recurrent neural network (RNN) to improve prediction of future metrics, where the multi-stream RNN includes a series of RNNs, one RNN for each metric and one RNN for each event sequence; and modeling causality relations between the multivariate metric series and the individual events in the event series by employing an attention mechanism to identify target events responsible for fluctuations of one or more target metrics, the attention mechanism including a causal attention mechanism and an input attention mechanism, the casual attention mechanism used over hidden states to compute a context vector and a distinct attention layer is used on each RNN to identify that different metrics draw on different information from past input windows, where weights of the causal attention mechanism are independent of each other, and the input attention mechanism is applied over context vectors of every RNN as a dot-product operation to aggregate the information from the metrics resulting in an aggregated vector forwarded to metric-specific linear layers to generate respective predicted future values for each metric.

2. The method of claim 1, wherein the multivariate metric series include log data.

3. The method of claim 1, wherein the multi-stream RNN is trained by using historical metrics data and historical event log data.

4. The method of claim 1, wherein the target events responsible for the fluctuations of the one or more target metrics are ranked and displayed in a ranked list.

5. The method of claim 1, wherein a network loss is computed as a total mean squared error (MSE).

6. The method of claim 1, wherein the causal attention mechanism assigns weights to different events to model influences of the different events on a prediction of the one or more target metrics.

7. The method of claim 1, wherein the input attention mechanism assigns weights to different metrics to model influences of each of the different metrics on a prediction of the one or more target metrics.

8. The method of claim 1, wherein, after a training phase, a user specifies a prediction horizon during which values of the one or more target metrics are to be predicted.

9. The method of claim 8, wherein log data is retrieved in a context time window of a predetermined length preceding a current time.

10. A non-transitory computer-readable storage medium comprising a computer-readable program for system metric prediction and influential events identification by concurrently employing metric logs and event logs, wherein the computer-readable program when executed on a computer causes the computer to perform the steps of:

concurrently modeling multivariate metric series and individual events in event series by a multi-stream recurrent neural network (RNN) to improve prediction of future metrics, where the multi-stream RNN includes a series of RNNs, one RNN for each metric and one RNN for each event sequence; and modeling causality relations between the multivariate metric series and the individual events in the event series by employing an attention mechanism to identify target events responsible for fluctuations of one or more target metrics, the attention mechanism including a causal attention mechanism and an input attention mechanism, the casual attention mechanism used over hidden states to compute a context vector and a distinct attention layer is used on each RNN to identify that different metrics draw on different information from past input windows, where weights of the causal attention mechanism are independent of each other, and the input attention mechanism is applied over context vectors of every RNN as a dot-product operation to aggregate the information from the metrics resulting in an aggregated vector forwarded to metric-specific linear layers to generate respective predicted future values for each metric.

11. The non-transitory computer-readable storage medium of claim 10, wherein the multivariate metric series include log data.

12. The non-transitory computer-readable storage medium of claim 10, wherein the multi-stream RNN is trained by using historical metrics data and historical event log data.

13. The non-transitory computer-readable storage medium of claim 10, wherein the target events responsible for the fluctuations of the one or more target metrics are ranked and displayed in a ranked list.

14. The non-transitory computer-readable storage medium of claim 10, wherein a network loss is computed as a total mean squared error (MSE).

15. The non-transitory computer-readable storage medium of claim 10, wherein the causal attention mechanism assigns weights to different events to model influences of the different events on a prediction of the one or more target metrics.

16. The non-transitory computer-readable storage medium of claim 10, wherein the input attention mechanism assigns weights to different metrics to model influences of each of the different metrics on a prediction of the one or more target metrics.

17. The non-transitory computer-readable storage medium of claim 10, wherein, after a training phase, a user specifies a prediction horizon during which values of the one or more target metrics are to be predicted.

18. The non-transitory computer-readable storage medium of claim 17, wherein log data is retrieved in a context time window of a predetermined length preceding a current time.

19. A system for system metric prediction and influential events identification by concurrently employing metric logs and event logs, the system comprising:

a memory; and one or more processors in communication with the memory configured to:

concurrently model multivariate metric series and individual events in event series by a multi-stream recurrent neural network (RNN) to improve prediction of future metrics, where the multi-stream RNN includes a series of RNNs, one RNN for each metric and one RNN for each event sequence; and model causality relations between the multivariate metric series and the individual events in the event series by employing an attention mechanism to identify target events responsible for fluctuations of one or more target metrics, the attention mechanism including a causal attention mechanism and an input attention mechanism, the casual attention mechanism used over hidden states to compute a context vector and a distinct attention layer is used on each RNN to identity that different metrics draw on different information from past input windows, where weights of the causal attention mechanism are independent of each other, and the input attention mechanism is applied over context vectors of every RNN as a dot-product operation to aggregate the information from the metrics resulting in an aggregated vector forwarded to metric-specific linear layers to generate respective predicted future values for each metric.

20. The system of claim 19, wherein the causal attention mechanism assigns weights to different events to model influences of the different events on a prediction of the one or more target metrics and the input attention mechanism assigns weights to different metrics to model influences of each of the different metrics on a prediction of the one or more target metrics.

* * * * *